United States Patent [19]

Iida et al.

[11] 4,345,432
[45] Aug. 24, 1982

[54] EXHAUST GAS PURIFYING SYSTEM FOR INTERNAL COMBUSTION ENGINE

[75] Inventors: Koso Iida; Hideo Shiraishi; Haruki Higashi, all of Hiroshima, Japan

[73] Assignee: Toyo Kogyo Co., Ltd., Hiroshima, Japan

[21] Appl. No.: 169,488

[22] Filed: Jul. 16, 1980

[30] Foreign Application Priority Data

Jul. 16, 1979 [JP] Japan .............................. 54-98690[U]

[51] Int. Cl.³ .......................... F01N 3/22; F02D 17/02
[52] U.S. Cl. ........................................ 60/290; 60/301; 60/306; 123/198 F; 123/580
[58] Field of Search ................. 60/289, 290, 301, 306; 123/198 F, 580

[56] References Cited

U.S. PATENT DOCUMENTS

| | | | |
|---|---|---|---|
| 3,578,116 | 5/1971 | Nakajima | 123/198 F |
| 3,826,089 | 7/1974 | Nakajima | 60/290 |
| 3,842,600 | 10/1974 | Nakajima | 60/301 |
| 3,869,858 | 3/1974 | Goto | 60/301 |
| 3,982,394 | 9/1976 | Hartel | 60/290 |
| 4,296,719 | 10/1981 | Takahashi | 123/198 F |

*Primary Examiner*—Douglas Hart
*Attorney, Agent, or Firm*—Wenderoth, Lind & Ponack

[57] ABSTRACT

An exhaust gas purifying system for an automobile engine including at least first and second engine cylinder has a shutter valve for interrupting the supply of a combustible air-fuel mixture to the first engine cylinder during a particular engine operating condition, a three-way electromagnetically operated valve for controlling the operation of the shutter valve, and a secondary air supply unit including a switching valve for selectively supplying a secondary air to a portion of an exhaust passage upstream of at least one catalyst unit disposed in the exhaust passage.

10 Claims, 2 Drawing Figures

EXHAUST GAS PURIFYING SYSTEM FOR INTERNAL COMBUSTION ENGINE

BACKGROUND OF THE INVENTION

The present invention relates to an exhaust gas purifying system for an automobile internal combustion engine.

U.S. Pat. No. 3,578,116, patented on May 11, 1971, discloses an exhaust gas purifying system including a selective supply control for interrupting the supply of air-fuel mixture to some of the engine cylinders or combustion chambers during deceleration to improve the combustion conditions so that waste of fuel and emission of a relatively large amount of noxious unburned components of the exhaust gases to the atmosphere can be minimized or substantially eliminated. This conventional system is applicable to a multi-cylinder internal combustion engine of a type having at least two engine cylinders or combustion chambers communicated to a source of air-fuel mixture, which is generally constituted by a carburetor, through an intake manifold of a type including a common duct, having one end communicated to the air-fuel mixture source, and first and second branch ducts extending from the other end of the common duct and leading to the respective engine cylinders.

The selective supply control employed in the above mentioned U.S. patent comprises a shutter or butterfly valve operatively positioned in the first branch duct for selectively interrupting and establishing the fluid circuit between the first branch duct and the corresponding engine cylinder. This shutter valve is normally biased to an opened position to establish the fluid circuit by a biasing spring element, said shutter valve being pivoted in a direction against the biasing spring element to a closed position to interrupt the fluid circuit in response to increase of the negative pressure which would take place inside a portion of the first branch duct upstream of the shutter valve with respect to the direction of flow of the air-fuel mixture towards the corresponding engine cylnder during deceleration of the automobile engine. During the closure of the shutter valve, not only is the air-fuel mixture which would be introduced into the engine cylinder communicated with the first branch duct caused to flow into the second branch duct and then towards the other engine cylinder, but also fresh air is introduced into the first branch duct at a position downstream of the shutter valve in the closed position.

It has been found that, with the conventional system having the construction described above, insufficient reduction of the amount of hydrocarbon and carbon oxide components of the exhaust gases emitted from the automobile engine occurs when the engine is operated under a non-loaded condition (i.e., when the engine torque is zero) and also under a light-loaded condition approximating the non-loaded condition (i.e., when the engine torque takes a positive value but approximating the zero engine torque). The reason for this will now be discussed.

As is well known to those skilled in the art, when the engine is operated under either one of these non-loaded and light-loaded conditions, the exhaust gases then emitted from the automobile engine contain as large an amount of hydrocarbon and carbon oxide components as during deceleration. On the other hand, the closure of the shutter valve when the engine is operated under either of the non-loaded and loaded condition adversely affects the drivability of the engine. Therefore, the shutter valve is operated, i.e., closed, only during the deceleration.

For this reason, with the conventional system now under discussion, a sufficient suppression of the emission of some noxious unburned components of the exhaust gases cannot be achieved under a particular condition during deceleration of the engine. More specifically, the deceleration of the automobile engine is generally understood as including not only a full deceleration wherein the engine is driven while the throttle valve is substantially closed, but also a substantially half-deceleration wherein either the throttle opening is relatively small, or the engine revolutions per unit time, that is, the engine speed, is relatively high, with respect to a characteristic curve the particular engine exhibits during the non-loaded condition in the relationship between the throttle opening and the engine speed, that is, wherein the engine is, even though the throttle valve is opened, driven by an external force, for example, by a moving vehicle body. It is to be noted that, during the half-deceleration of the engine, the engine torque takes a negative value.

In view of the above, the conventional system now under discussion will not operate effectively and satisfactorily unless the shutter valve is controlled at a predetermined timing by the precise detection of whether the engine is operated under the full deceleration or whether the same engine is operated under the half deceleration. This disadvantage appears to be attributed to the utilization of the negative pressure developed in the portion of the first branch duct upstream of the shutter valve. In particular, since the characteristic curve showing the relationship between the throttle opening and the engine speed required to establish an iso-vacuum, that is, an iso-vacuum line, tends to divert during a high speed operating condition of the engine from the characteristic curve the engine exhibits during the non-loaded condition in the same relationship, a relatively large amount of the noxious unburned components of the exhaust gases are emitted during the high speed operating condition of the engine.

U.S. Pat. No. 3,869,858, patented on Mar. 11, 1975, discloses an exhaust gas purifying system including an exhaust manifold having a thermal reactor, a reducing-catalyst unit and an oxidizing-catalyst unit, all fluid-connected in series with each other in the order given above from the automobile internal combustion engine. This exhaust gas purifying system also includes a switching valve assembly for supplying secondary air selectively to respective portions of the exhaust manifold upstream of the thermal reactor and downstream of the reducing-catalyst unit according to a particular engine operating condition. More specifically, in one particular engine operating condition, for example, during the cold-start of the engine, the switching valve is held in position to supply most of the secondary air to the portion of the exhaust manifold upstream of the thermal reactor so that the carbon oxide and hydrocarbon components contained in large quantities in the exhaust gases can be reburned on one hand and, on the other hand, an oxidizing atmosphere can be maintained in a portion of the exhaust manifold between the thermal reactor and the reducing-catalyst unit to enable the reducing catalyst to act like an oxidizing catalyst for further reducing the amounts of the carbon oxide and hydrocarbon components.

In another engine operating condition, for example, after the engine has been warmed up, the switching valve assembly is held in position to supply most of the secondary air to the portion of the exhaust manifild downstream of the reducing-catalyst unit and upstream of the oxidizing-catalyst unit. However, after the engine has been warmed up and when a heavy load is imposed on the engine, the switching valve assembly is, on account of the reduction of negative pressure inside the intake manifold, held in position to supply most of the secondary air to the portion of the exhaust manifold upstream of the thermal reactor so that the thermal reactor serves to reduce the CO and HC proportions in the exhaust gases on one hand and an optimum exhaust gas-air mixing ratio can be provided at the entry of the reducing catalyst unit for the control of the NOx component of the exhaust gases.

SUMMARY OF THE INVENTION

The present invention has been developed with a view to substantially eliminating the disadvantages inherent in the prior art exhaust gas purifying system of the type such as disclosed in the first-mentioned U.S. patent and is intended to provide an improved exhaust gas purifying system effective to reduce the amount of noxious unburned components of the exhaust gases throughout the entire range of deceleration of the engine.

Another important object of the present invention is to provide an improved exhaust gas purifying system of the type referred to above, which is reliable in operation and does not require any complicated, precisely designed fluid-operated valve assemblies of a type often constituting a cause of trouble.

A further object of the present invention is to provide an improved exhaust gas purifying system of the type referred to above, which can readily be applicable to any existing automobile engine without an unreasonably increased cost insofar as the fuel intake system of the existing engine has a shutter valve installed therein.

The problem underlying the present invention resides in that, although the utilization of the shutter valve such as disclosed in the first-mentioned U.S. patent is effective to reduce the amount of the noxious unburned components of the exhaust gases to some extent, the shutter valve cannot be operated during any engine operating condition other than the low-loaded engine operating condition, that is, deceleration, wherein the engine torque takes a negative value, to save the engine drivability from being adversely affected. The failure of the shutter valve to operate during any engine operating condition other than deceleration means that no sufficient reduction of the HC and CO proportions in the exhaust gases cannot be achieved when the engine is operated under light-loaded operating condition, that is, when the engine torque takes a positive value, but approximating the zero engine torque.

Accordingly, the present invention supplies an increased amount of secondary air into a portion of the exhaust manifold downstream of the reducing catalyst unit with respect to the direction of flow of exhaust gases towards the atmosphere to get the reducing catalyst unit an oxidizing condition for reducing the HC and CO proportions in the exhaust gases emitted when the engine is operated under the non-loaded, light-loaded and decelerating conditions. For this purpose, the present invention makes the best use of both the shutter valve, which may have a construction disclosed in the first-mentioned U.S. patent, and a selective supply control valve for selectively supplying secondary air to different portions of the exhaust manifold, in combination with an electric control circuitry developed for the purpose of the present invention.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
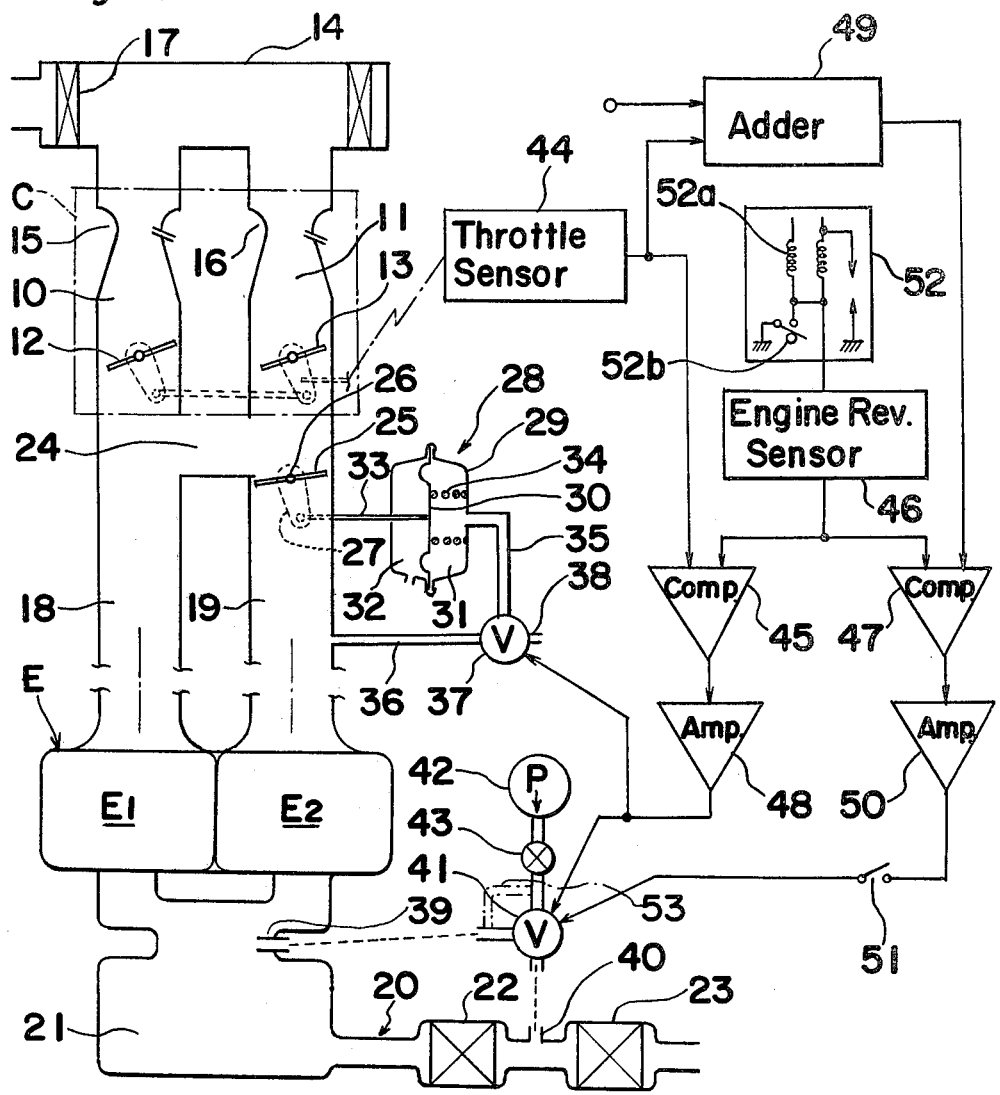
FIG. 1 is a schematic diagram showing an exhaust gas purifying system embodying the present invention.

Before the description of the present invention proceeds, it is to be noted that like parts are designed by like reference numerals throughout the accompanying drawings. It is also to be noted that, although the present invention is equally applicable the any known carburetor having a single intake duct for all of the engine cylinders such as disclosed in the first-mentioned U.S. patent, the present invention will be described as applied to an automobile engine having a plurality of, for example, two, engine cylinders and also having a carburetor of a type including separate first and second intake ducts and correspondingly separate throttle valves within the single carburetor.

Referring now to FIG. 1, the carburetor is generally identified by C and has first and second intake ducts 10 and 11 extending therethrough, throttle valves 12 and 13 supported inside the respective intake ducts 10 and 11 for pivotal movement between full open and substantially closed positions in synchronism with each other and operable in any known manner, and venturi sections 15 and 16 positioned inside the respective intake ducts 10 and 11 upstream of the associated throttle valves 12 and 13. The first and second intake ducts 10 and 11 are communicated at one end to the atmosphere through an air cleaner 14 mounted atop the carburetor C and having a ring-shaped, replaceable filtering element 17 as is well known to those skilled in the art. These first and second intake ducts 10 and 11 are also connected at their other end to respective engine cylinder E1 and E2 of an automobile internal combustion engine E through associated first and second intake passages 18 and 19. The engine cylinders E1 and E2 are in turn communicated to the atmosphere through an exhaust passage 20 having a thermal reactor 21, a reducing-catalyst unit 22 and an oxidizing-catalyst unit 23 all fluid-connected in series with each other in the order given above from the engine E.

In the proximity of the carburetor C, the first and second intake passages 18 and 19 are communicated to each other through a connecting passage 24, the function of which will become apparent from the subsequent description.

A shutter valve 25 for closing one of the first and second intake passages 18 and 19, for example, the second intake passage 19, during a particular engine operating condition, that is, deceleration, is installed inside the second intake passage 19 at a position in the proximity of and downwardly of the connecting passage 24 with respect to the direction of flow of combustible mixture towards the engine cylinders E1 and E2. This shutter valve 25 is supported in any known manner for pivotal movement between a closed position as shown and an opened position, it being to be understood that, when the shutter valve 25 is in the closed position, the combustible mixture formed inside the second intake duct 11 at a position upstream of the associated throttle valve 13 by combining fuel with air is, after the rate of delivery of such combustible mixture has been regulated by the throttle valve 13, forced to flow into the first intake passage 18 through the connecting passage 24. Naturally, the combustible mixture so forced to flow into the first intake passage 18 is mixed together with the combustible mixture formed inside the first intake duct 10 in a similar manner and flowing past the associated throttle valve 12 towards the engine cylinder E1 through the first intake passage 18. It is, therefore, clear that the engine cylinder E1 receives twice the volume of the combustible mixture as in the case of supplying the combustible mixture to all the engine cylinders E1 and E2 during the particular engine operating condition so that the combustion condition in the engine E as a whole can be improved.

The construction so far described above is substantially as disclosed in the first-mentioned U.S. patent.

The shutter valve 25 employed in the present invention is rigidly mounted on a shaft 26 for rotation together therewith, one end of said shaft 26 being situated outside the second intake passage 19 and having a trigger lever 27 rigidly mounted thereon. Operatively coupled with this trigger lever 27 is a diaphragm valve assembly 28 of a construction which will now be described.

The diaphragm valve assembly 28 comprises a valve casing 29 having a diaphragm member 20 dividing the interior of the casing 29 into first and second working chambers 31 and 32, the second working chamber 32 being communicated to the atmosphere. The diaphragm member 30 is connected to the trigger lever 27 through an operating rod 33 and is normally biased to the left as viewed in FIG. 1 by the action of a biasing spring 34 housed within the first working chamber 31. It is to be noted that, so long as the diaphragm member 30 is biased to the left by the action of the biasing spring 34, the shutter valve 25 is held in the closed position thereby interrupting the communication between the second intake duct 11 and the second intake passage 19, said shutter valve 25 being however brought into the opened position to establish communication between the second intake duct 11 and the second intake passage 19 in response to displacement of the diaphragm member 30 in a direction towards the right against the biasing spring 34. This rightward displacement of the diaphragm member 30 takes place when a sufficient negative pressure is developed inside the second intake passage 19 at a position downstream of the shutter valve 25.

In order to introduce the negative pressure inside the second intake passage 19 into the first working chamber 31 of the diaphragm valve assembly 28, the first working chamber 31 is communicated with a portion of the second intake passage 19 downstream of the shutter valve 25 through a fluid passage, comprised of a first passage portion 35 leading from the first working chamber 31 and a second passage portion 36 communicated with the second intake passage 19, by way of a three-way electromagnetically operated valve unit 37 disposed between the first and second passage portions 35 and 36. The three-way electromagnetically operated valve unit 37 herein employed has a construction capable of assuming inoperative and operated positions one at a time and is operable in such a manner that, when in the inoperative position without being energized, the valve unit 37 is held in position to establish the communication between the passage portions 35 and 36, but when in the operated position incident to energization thereof, the valve unit 37 is held in position to communicate the passage portion 35 to the atmosphere through a vent 38.

From the foregoing, it will readily be seen that when the three-way electromagnetically operated valve unit 37 is not energized electrically, the negative pressure inside the second intake passage 19 is introduced into the first working chamber 31 of the diaphragm valve assembly 28 to displace the diaphragm member 30 towards the right against the biasing spring 34, thereby causing the shutter valve 25 to assume the opened position. On the other hand, when the three-way electromagnetically operated valve unit 37 is energized electrically, the communication between the passage portions 35 and 36 is interrupted and the first working chamber 31 is communicated with the atmosphere, thereby allowing the diaphragm member 30 to be biased leftwards by the action of the biasing spring 34 and the shutter valve 25 is consequently held in the closed position.

A selective supply control for supplying secondary air selectively to an upstream portion of the thermal reactor 21 and a portion of the exhaust passage 20 between the reducing-catalyst unit 22 and the oxidizing-catalyst unit 23 comprises a first air supply nozzle 39 communicated with the upstream portion of the thermal reactor 21 in any known manner, a second air supply nozzle 40 communicated with the portion of the exhaust passage 20 between the catalyst units 22 and 23, and an electromagnetically operated switching valve unit 41, said first and second air supply nozzles 39 and 40 being adapted to be selectively communicated with a source of secondary air through the switching valve unit 41 by way of an air supply pump 42. The secondary air source may be either the atmosphere or a clean side of the air cleaner 14. A passage connected between the air pump 42 and the switching valve unit 41 includes a shutoff valve 43 operable to interrupt the supply of the secondary air from the air pump to the switching valve unit 41 only when the engine speed exceeds a predetermined value, for example, 4,000 rpm, and the temperature of a cooling fluid used to cool the engine is lower than a predetermined value, for example, 15° C.

The switching valve unit 41 is operable in such a manner that, when the valve unit 41 is electrically energized, the valve unit 41 is held in position to allow the secondary air to be supplied into the upstream portion of the thermal reactor 21 through the nozzle 39, but when it is not energized, the valve unit 41 is held in position to allow the secondary air to be supplied through the nozzle 40 into that portion of the exhaust passage 20 between the catalyst units 22 and 23.

In the construction so far described, when and so long as the valve unit 41 is in position to allow the supply of the secondary air from the secondary air source to that portion of the exhaust passage 20 between the catalyst units 22 and 23 through the nozzle 40, the exhaust gases emitted from the engine E include a quantity of air not larger than that required to attain the stoichiometric air-fuel mixing ratio and flow through the reducing-catalyst unit 22 under net reducing condition, because fuel has been burned in the engine with a quantity of air not greater than that required to attain the stoichiometric air-fuel mixing ratio. Therefore, a large quantity of NOx component in the exhaust gases is reduced by contact with the reducing catalyst in the unit 22 and, at the same time, a small quantity of HC and CO components of the same exhaust gases is reduced in the same catalyst unit 22. The exhaust gases emerging from the reducing-catalyst unit 22 are subsequently mixed with the secondary air supplied through the nozzle 40 in an amount greater than that required to attain the stoichiometric air-fuel mixing ratio together with the fuel. Therefore, the exhaust gases flowing to the oxidizing-catalyst unit 23 flow through the oxidizing-catalyst unit 23 under oxidizing conditions, being readily oxidized by contact with the oxidizing catalyst in the unit 23.

On the other hand, when and so long as the valve unit 41 is held in position to allow the supply of the secondary air from the secondary air source to the upstream portion of the thermal reactor 21 through the nozzle 39, the exhaust gases emitted from the engine E, which exhaust gases are in a reducing condition, are mixed with the secondary air supplied through the nozzle 39, whereby they are changed so as to be in an oxidizing condition. Therefore, the exhaust gases flow in an oxidizing condition through both the catalyst unit 22 and the catalyst unit 23 and, consequently, both the reducing-catalyst unit 22 and the oxidizing-catalyst unit 23 serve to oxidize the CO and HC components of the exhaust gases so that the purifying efficiency of the reducing-catalyst unit 22 improved.

It is to be noted that it is not necessarily required to completely interrupt the supply of the secondary air into the upstream portion of the thermal reactor 21 through the nozzle 39 when the valve unit 41 is held in position to allow the supply of the secondary air into the portion of the exhaust passage 20 between the catalyst units 22 and 23 through the nozzle 40, but a relatively small amount of secondary air may be supplied into the upstream portion of the thermal reactor 21 so that the amount of oxygen in the reducing catalyst in the unit 22 can be increased to a value approximating to the stoichiometrical amount to facilitate the purification of the CO and HC components of the exhaust gases. This can readily be achieved by providing a by-pass passage of relatively small internal cross sectional area, shown by the phantom lines 53 in FIG. 1.

The operation of both of the electromagnetically operated valve units 37 and 41 is controlled by a control circuitry having a construction which will now be described.

Referring still to FIG. 1, the control circuitry comprises a throttle sensor 44 for detecting the throttle opening and for generating an output signal indicative of the opening of either one of the throttle valves 12 and 13 and a first comparator 45, an engine revolution sensor 46 for detecting the number of revolutions of the engine E and for generating an output signal indicative of the engine speed, and a second comparator 47.

The first comparator 45 has a pair of input terminals, one connected electrically to the throttle sensor 44 and the other connected electrically to the engine revolution sensor 46, and an output terminal connected electrically through a first amplifier 48 to both of the valve units 37 and 41. On the other hand, the second comparator 47 has a pair of input terminals, one connected electrically to the engine revolution sensor 46 and the other connected electrically to the throttle sensor 44 through an adder 49, and an output terminal connected electrically to a second amplifier 50. The second amplifier 50 is in turn electrically connected to the valve unit 41 through a temperature responsive switch 51 operable to open the circuit between the second amplifier 50 and the valve unit 41 when the engine cooling fluid is at a temperature lower than a predetermined value, for example, 80° C. during the cold start of the engine E at which time the choke valve is closed and a relatively large amount of noxious unburned components of the exhaust gases tend to be emitted.

Figure 2:
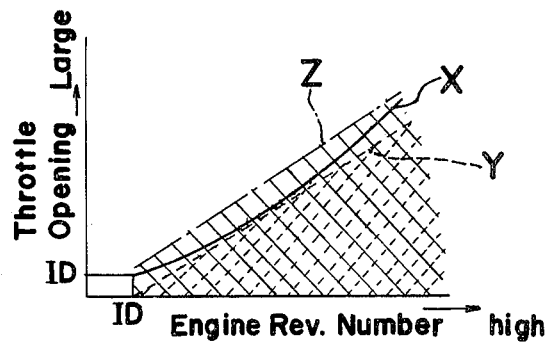
FIG. 2 is a graph showing a characteristic curve an automobile engine exhibits during the non-loaded operating condition for the relationship between the throttle opening and the engine speed.

The first detector is so designed as to cause the first comparator 45 to generate an output signal when the load imposed on the engine E becomes lower than a first predetermined value which is shown by a line Y in the graph of FIG. 2 and which is slightly lower than the non-load shown by a curve X in the graph of FIG. 2, that is, when the load imposed on the engine E falls within the broken-line hatched area in the graph of FIG. 2. On the other hand, the second detector is so designed as to cause the second comparator 47 to generate an output signal when the load imposed on the engine E becomes lower than a second predetermined value which is shown by a line Z in the graph of FIG. 2 and which is slightly higher than the non-load shown by the curve X, that is, when the load imposed on the engine E falls within the solid-line hatched area in the graph of FIG. 2.

The throttle sensor 44 may have a construction including a variable resistor having a movable tap mechanically connected to one or both of the throttle valves 12 and 13 and capable of generating an output signal, the voltage of which is determined by the position of the movable tap and is proportional to the opening of the throttle valves 12 and 13. The engine revolution sensor 46 may be connected to any known engine contact breaker 52b, so that the sensor 46 can count the number of pulses proportional to the number of revolutions of the engine E and then convert the counted number of the pulses into an analog signal, the voltage of which is proportional to the number of revolutions of the engine E.

The adder 49 serves to establish the difference between the first and second predetermined values respectively shown by the lines Y and Z in the graph of FIG. 2. Specifically, this adder 49 serves to add a predetermined voltage to the voltage of the output signal from the throttle sensor 44 prior to such output signal from the throttle sensor 44 being applied to the second comparator 47. The adder 49 may, however, not be always necessary if the circuitry is so designed that the respective voltages of the output signals from the throttle sensor 44 and the engine revolution sensor 46, which are to be supplied to the associated comparators 45 and 47, differ from each other by a voltage difference corresponding to the space between the lines Z and Y shown in the graph of FIG. 2.

It is to be noted that although in the graph of FIG. 2 the lines Y and Z are each shown in the form of a straight line, it is possible to make the output characteristic of at least one of the throttle sensor 44 and the engine revolution sensor 46 vary relative to the throttle opening or the engine speed so that the lines Y and Z will be a curve approximating and substantially in parallel relation to the non-load curve X.

The first comparator 45 serves to compare the output signal fed from the throttle sensor 44 with the output signal fed from the engine revolution sensor 46 to detect the loaded operating condition of the engine E. On the other hand, the second comparator 47 serves to compare the output signal fed from the throttle sensor 44 through the adder 49 with the output signal fed from the engine revolution sensor 46 to detect the loaded operating condition of the engine E.

In the construction so far described, when and so long as the first comparator 45 generates an output signal, both of the valve units 37 and 41 are electrically energized simultaneously. When the valve 37 is so energized, the communication between the passage portions 35 and 36 is interrupted and the first working chamber 31 of the diaphragm valve assembly 28 is communicated with the atmosphere, thereby causing the shutter valve 25 to assume the closed position by the action of the biasing spring 34. On the other hand, when the valve unit 41 is so energized, the valve unit 41 is held in position to allow the supply of the secondary air from the secondary air source into the upstream portion of the thermal reactor 21 through the nozzle 39 while the supply of the secondary air to that portion of the exhaust passage 20 between the catalyst units 22 and 23 is interrupted completely.

When and so long as the second comparator 47 generates an output signal and the temperature responsive switch 51 is closed, the valve unit 41 is electrically energized to assume the position in which the supply of the secondary air from the secondary air source to the upstream portion of the thermal reactor 21 through the nozzle 39 is permitted while the supply of the same into that portion of the exhaust passage 20 through the nozzle 40 is interrupted. However, since the temperature responsive switch 51 is opened only when the temperature of the engine cooling fluid is lower than the predetermined value of 80° C. during the cold start of the engine E, the output signal from the second comparator 47 is not applied to the valve unit 41 through the second amplifier 50 during that time.

As shown in the graph of FIG. 2, each of the first and second predetermined values at which the corresponding detector, that is, an corresponding comparator 45 or 47, generates the output signal varies, as shown by the associated line Y or Z, depending on the relationship between the throttle opening and the engine speed. The line Y for the first predetermined value is so set at a position below the characteristic curve X determined during the non-load engine operating condition by the engine speed relative to the throttle opening, that the first comparator 45 can generate an output signal when the load imposed on the engine E falls within the range of load below the line Y shown by the broken-line hatched area, that is, during deceleration. On the other hand, the line Z for the second predetermined value is so set at a position above the characteristic curve X that the second comparator 47 can generate the output signal when the load imposed on the engine E falls within the range of load below the line Z shown by the solid-line hatched area and including the range of deceleration below the characteristic curve X and a low-loaded area somewhat above the characteristic curve X.

As hereinbefore described, the shutter valve 25 can be moved to the closed position relatively accurately throughout the entire range of deceleration of the engine E by the utilization of the output signal from the first detector. Therefore, during the deceleration of the engine E in which the combustion condition in the engine E tends to be lowered with a relatively great possibility of failure to ignite the combustible mixture and, consequently, the engine E tends to emit an exhaust gases containing a relatively large amount of the noxious unburned components, the combustible mixture to be supplied into the engine cylinder E2 is forced to flow into the engine cylinder E1 through the connecting passage 24 and then the first intake passage 18 to improve the combustion condition, thereby suppressing the emission of the exhaust gases containing the large amount of the noxious unburned components which would occur when the shutter valve 25 is not moved to the closed position during the deceleration of the engine E.

Moreover, by the utilization of the output signal from the second comparator 47, the supply of the secondary air to that portion of the exhaust passage 20 through the nozzle 40 can be switched to the upstream portion of the thermal reactor 21 through the nozzle 39 during either of the low-loaded engine operating condition and deceleration. Therefore, the exhaust gases emitted during such engine operating condition contain a less amount of NOx component on one hand and, on account of the supply of the secondary air to the upstream portion of the thermal reactor 21, the exhaust gases ready to enter the reducing-catalyst unit 22 and then the oxidizing-catalyst unit 23 are made oxidizing. Because of this, the CO and HC proportions in the exhaust gases can be reduced by both the catalyst units 22 and 23. Also, during the deceleration of the engine E below the first predetermined value shown by the line Y in FIG. 2, since the shutter valve 25 is also held in the closed position, the amount of the noxious unburned components of the exhaust gases can further be reduced. During the condition in which the load inposed on the engine E is within the range between the first predetermined value shown by the line Y and the characteristic curve X, both of the catalyst units 22 and 23 serve to minimize the amount of the CO and HC components of the exhaust gases prior to the latter being discharged to the atmosphere.

Although the present invention has fully been described in connection with the preferred embodiment thereof with reference to the accompanying drawings, it is to be noted that various changes and modifications will be apparent to those skilled in the art. By way of example, although the biasing spring 34 has been described as housed within the valve casing 24, it may be disposed externally of the valve casing 24, in which case the biasing spring 34 may be a tension spring. Moreover, the use of the thermal reactor 21 is not always essential in carrying out the present invention.

Accordingly such changes and modifications are to be understood as being included within the true scope of the present invention unless they depart therefrom.

We claim:

1. An exhaust gas purifying system for an automobile engine of a type including a source of combustible air-fuel mixture, a fuel intake system extending between the combustible mixture source and at least first and second engine cylinders, said intake system including a main passage communicated with the combustible mixture source and at least first and second intake passage means communicated at one end with the main passage and at the other end to the respective first and second engine cylinders; and an exhaust passage means communicated at one end with the first and second engine cylinders and at the other end with the atmosphere for the discharge of exhaust gases emitted from the engine as a result of the combustion of the combustible mixture, said exhaust gas purifying system comprising, in combination:

- a shutter valve supported inside the first intake passage means for movement between a closed position, in which the supply of the combustible mixture from the combustible mixture source to the first engine cylinder is interrupted, and an opened position in which the combustible mixture from the combustible mixture source is supplied to all of the engine cylinders;
- valve operating means for positioning the shutter valve selectively in the closed and opened positions;
- a first catalyst unit disposed in the exhaust passage means;
- a first air supply means communicated at one end with a source of secondary air and at the other end with a first portion of the exhaust passage means upstream of the first catalyst unit with respect to the direction of flow of the exhaust gases towards the atmosphere;
- means for controlling the supply of the secondary air from the secondary air source to the first portion of the exhaust passage means; and
- means for causing said valve operating means to position the shutter valve in the closed position by the detection of a decelerated condition of the engine and also for causing the controlling means to operate so as to increase the supply of the secondary air to the first portion of the exhaust passage means by the detection of an engine operating condition in which the load is smaller than a predetermined load which is larger than said decelerated condition.

2. A system as claimed in claim 1, wherein said engine operating condition is a light-loaded engine operating condition wherein the load condition is larger than the non-load.

3. A system as claimed in claim 2, wherein the exhaust gases emitted from the engine cylinders and ready to be introduced into the first catalyst unit are in a reducing condition when the load imposed on the engine is larger than the light-loaded engine operating condition and in an oxidizing condition when the load imposed on the engine is smaller than the light-loaded engine operating condition and also when the amount of the secondary air to be introduced into the first portion of the exhaust passage means is increased.

4. A system as claimed in claim 1 or 2, further comprising a second catalyst unit disposed in the exhaust passage means at a position downstream of the first catalyst unit and a second air supply means communicated at one end with the secondary air source and at the other end with a second portion of the exhaust passage means between the first and second catalyst units, the exhaust gases ready to enter the first catalyst unit being, when the secondary air introduced into the first portion of the exhaust passage means is increased, caused to be in an oxidizing condition, said controlling means also controlling the supply of the secondary air to the second portion of the exhaust passage means.

5. A system as claimed in claim 4, wherein said controlling means includes a switching valve means capable of assuming first and second different operative positions, said switching valve means when in the first operative position permitting the supply of the secondary air to the first portion of the exhaust passage means through the first air supply means, but when in the second operative position permitting the supply of the secondary air to the second portion of the exhaust passage means through the second air supply means.

6. A system as claimed in claim 1 further comprising electric circuit means for controlling the valve operating means and including a throttle sensor for detecting the opening of at least one throttle valve forming a part of the combustible mixture source and generating an output signal indicative of the throttle opening, an engine revolution sensor for detecting the speed of the engine and generating an output signal indicative of the engine speed, and a comparator to which the outputs of said throttle sensor and said engine revolution sensor are connected for comparing said outputs and generating a control output during the particular engine operating condition, said comparator being connected to control said valve operating means for supplying said control output thereto.

7. A system as claimed in claim 1, wherein said valve operating means comprises a diaphragm valve assembly including a diaphragm member and a valve casing having at least one working chamber defined by the diaphragm member and the casing, said diaphragm member being displaceable between first and second positions and operatively coupled to the shutter valve, a biasing means for biasing the diaphragm member to the first position, said shutter valve being held in the closed position when and so long as the diaphragm member is biased to the first position, a signal transmitting passage means constituted by first and second passage portions fluid-communicated respectively to the working chamber of the diaphragm valve assembly and a portion of the intake system, and a control valve means capable of assuming first and second different operative positions, said control valve means when in the first operative position establishing the first fluid-communication between the first and second passage portions and, when in the second operative position, interrupting said first fluid-communication and communicating the first passage portion with the atmosphere.

8. In an exhaust gas purifying system for an automobile engine of a type including a source of combustible air-fuel mixture, a fuel intake system extending between the combustible mixture source and at least first and second engine cylinders, said fuel intake system including a main passage communicated with the combustible mixture source and at least first and second intake passage means communicated at one end with the main passage and at the other end with the respective first and second engine cylinders, an exhaust passage means communicated at one end with the first and second engine cylinders and at the other end with the atmosphere for the discharge of exhaust gases emitted from the engine as a result of the combustion of the combustible mixture, a first catalyst unit disposed in the exhaust passage means, a second catalyst unit disposed in the exhaust passage means at a position downstream of the first catalyst unit with respect to the direction of flow of the exhaust gases towards the atmosphere, and a shutter valve supported inside the first intake passage means for movement between a closed position, in which the supply of the combustible mixture from the combustible mixture source to the first engine cylinder is interrupted, and an opened position in which the combustible mixture from the combustible mixture source is supplied to all of the engine cylinders, said shutter valve being normally biased to assume the closed position, but capable of being moved to the opened position in response to an increase of the negative pressure inside the first intake passage means over a predetermined value, the improvement which comprises:

a first air supply means communicated at one end with a first portion of the exhaust passage means and at the other end with a source of secondary air;

a second air supply means communicated at one end with a second portion of the exhaust passage means between the first and second catalyst units and at the other end with the secondary air source;

a switching valve means disposed in a fluid circuit connecting the other ends of the respective first and second air supply means to the secondary air source and capable of assuming first and second different operative positions, said switching valve means when in the first operative position permitting the supply of the secondary air to the first portion of the exhaust passage means, and when in the second operative position permitting the supply of the secondary air to the second portion of the exhaust passage means; and an electric control circuitry including a first detector for generating an output signal when the load imposed on the engine falls within a range below a first predetermined value slightly lower than the non-load condition and a second detector for generating an output signal when the load imposed on the engine falls within a range below a second predetermined value slightly higher than the non-load condition, said electric control circuitry being connected to said shutter valve and said switching valve means for using the output from the first detector for causing the shutter valve to assume the closed position, and using said output signal from the second detector for causing the switching valve means to assume the first operative position to increase the supply to the secondary air to the first portion of the exhaust passage means.

9. A system as claimed in claim 8, further comprising a temperature responsive switch capable of opening when the temperature of an engine cooling fluid is lower than a predetermined temperature, and connected to the supply of the secondary air to the first portion of the exhaust passage means for effecting supply only during the opening of the temperature responsive switch.

10. In an exhaust gas purifying system for an automobile engine having an intake passage means for leading air-fuel mixture to an engine cylinder, a throttle valve disposed in the intake passage means for controlling amount of the air-fuel mixture, an exhaust passage means communicated at one end with the engine cylinders and at the other end with the atmosphere for the discharge of exhaust gases emitted from the engine as a result of the combustion of the air-fuel mixture, a first catalyst unit disposed in the exhaust passage means, and a second catalyst unit disposed in the exhaust passage means at a position downstream of the first catalyst unit with respect to the direction of flow of the exhaust gases towards the atmosphere, the improvement which comprises:

a first air supply means communicated at one end with a first portion of the exhaust passage means upstream of the first catalyst unit and at the other end with a source of secondary air;

a second air supply means communicated at one end with a second portion of the exhaust passage means between the first and second catalyst units and at the other end with the secondary air source;

a switching valve means disposed in a fluid circuit connecting the other ends of the respsective first and second air supply means to the secondary air source and capable of assuming first and second different operative positions, said switching valve means when in the first operative position permitting the supply of the secondary air to the first portion of the exhaust passage means, and when in the second operative position permitting the supply of the secondary air to the second portion of the exhaust passage means; and an electric control circuitry including a throttle sensor for detecting the opening of at least one throttle valve forming a part of the combustible mixture source and generating an output signal indicative of the throttle opening, an engine revolution sensor for detecting the speed of the engine and generating an output signal feed indicative of the engine speed, and a comparator for comparing said output signals and generating a control output for detecting an engine operating condition in which the load imposed on the engine falls within a range below a predetermined value slightly higher than the non-load condition, said circuitry being connected to said switching valve means for supplying said control output to said switching valve means for setting said switching valve means in the first operative position to increase the supply of the secondary air to the first portion of the exhaust passage means when said comparator detects said engine operating condition.

* * * * *